(12) United States Patent
Yeom et al.

(10) Patent No.: US 9,513,429 B2
(45) Date of Patent: Dec. 6, 2016

(54) BACKLIGHTING ASSEMBLY COMBINED WITH LCD ASSEMBLY AND METHOD FOR COMBINING THE SAME USING A DOUBLE-SIDED ADHESIVE MEMBER

(71) Applicant: Samsung Display Co., Ltd., Yongin, Gyeonggi-Do (KR)

(72) Inventors: Dong-Yeol Yeom, Suwon-si (KR); Sun Hee Oh, Anyang-si (KR); Rae Young Kim, Hwaseong-si (KR); Taek-Sun Shin, Hwaseong-si (KR); Kwang-Wook Choi, Osan-si (KR)

(73) Assignee: Samsung Display Co., Ltd. (KR)

( * ) Notice: Subject to any disclaimer, the term of this patent is extended or adjusted under 35 U.S.C. 154(b) by 90 days.

(21) Appl. No.: 14/213,219

(22) Filed: Mar. 14, 2014

(65) Prior Publication Data

US 2015/0124197 A1    May 7, 2015

(30) Foreign Application Priority Data

Nov. 6, 2013   (KR) .................. 10-2013-0134394

(51) Int. Cl.
*G02F 1/1333* (2006.01)
*F21V 8/00* (2006.01)

(52) U.S. Cl.
CPC .......... *G02B 6/0091* (2013.01); *G02B 6/0023* (2013.01); *G02B 6/0068* (2013.01); *G02B 6/0083* (2013.01); *Y10T 156/1089* (2015.01)

(58) Field of Classification Search
CPC ... G02B 6/0091; G02B 6/0073; G02B 6/0083; G02B 6/0068; G02B 6/0023; G02F 2202/28; G02F 1/133603; G02F 1/133615; Y10T 156/1089
USPC ............................................ 349/58, 65, 122
See application file for complete search history.

(56) References Cited

U.S. PATENT DOCUMENTS

| | | | |
|---|---|---|---|
| 6,864,943 B2 * | 3/2005 | Hirakata | ............ G02F 1/1341 349/153 |
| 7,808,576 B2 | 10/2010 | Takahashi et al. | |
| 8,253,887 B2 | 8/2012 | Jung | |
| 8,310,620 B2 | 11/2012 | Yabe | |

(Continued)

FOREIGN PATENT DOCUMENTS

| | | |
|---|---|---|
| JP | 2006-154320 | 6/2006 |
| JP | 2008-170691 | 7/2008 |

(Continued)

*Primary Examiner* — Nathanael R Briggs
(74) *Attorney, Agent, or Firm* — Innovation Counsel LLP

(57) ABSTRACT

The high intensity light output of edge lighting point light sources such as LEDs may generate undesired leakage light that is optically conducted by way of a continuum of the material of a components affixing adhesive member. In accordance with present disclosure, air filled grooves or other such discontinuities are formed in the adhesive member along respective light output pathways of the respective point light sources. One corresponding embodiment comprises spaced apart LEDs mounted on an FPCB; a light guide plate (LGP) disposed adjacent to the LEDs; a main support accommodating the LEDs and the LGP; and an adhesive member formed to affix together the FPCB, the main support, and the light guide, wherein the adhesive member is patterned to define air filled grooves along respective light output pathways of the LEDs.

15 Claims, 13 Drawing Sheets

(56) References Cited

U.S. PATENT DOCUMENTS

2008/0002099 A1\* 1/2008 Oh .................. G02B 6/0091
                                                349/65
2010/0141865 A1\* 6/2010 Jung ................ G02F 1/133615
                                                349/61
2011/0141397 A1   6/2011 Lee
2011/0149203 A1\* 6/2011 Kim .................. G02B 6/002
                                                349/62

FOREIGN PATENT DOCUMENTS

| KR | 10-0771568 B1 | 10/2007 |
| KR | 10-2008-0006380 A | 1/2008 |
| KR | 10-2008-0084334 A | 9/2008 |
| KR | 10-2009-0090813 A | 8/2009 |
| KR | 10-2009-0128693 A | 12/2009 |
| KR | 10-2010-0063172 A | 6/2010 |
| KR | 10-2011-0111087 A | 10/2011 |
| KR | 10-1154242 | 6/2012 |
| KR | 10-1264700 | 5/2013 |

\* cited by examiner

BACKLIGHTING ASSEMBLY COMBINED WITH LCD ASSEMBLY AND METHOD FOR COMBINING THE SAME USING A DOUBLE-SIDED ADHESIVE MEMBER

CROSS-REFERENCE TO RELATED APPLICATION

This application claims priority to and the benefit of Korean Patent Application No. 10-2013-0134394 filed in the Korean Intellectual Property Office on Nov. 6, 2013, the entire contents of which are incorporated herein by reference.

BACKGROUND (a) Field

The present disclosure of invention relates to a backlighting assembly and a liquid crystal display (LCD) using the same, and more particularly, to a combination of a backlighting assembly and a liquid crystal display in which an adhesive member is disposed between point light sources provided on a flexible printed circuit board.

(b) Description of Related Technology

A liquid crystal display assembly typically includes a liquid crystal display module including a liquid crystal panel on which a to be displayed image is electronically formed, a flexible printed circuit board (FPCB) provided at an end of the liquid crystal panel, and a backlighting assembly (or "backlight assembly" for short) disposed at a bottom surface of the liquid crystal panel and configured to supply backlighting light to the panel. The LCD assembly typically further includes a bottom chassis which supports the bottom surface of the crystal display module, and a top case fastened to the bottom chassis to secure the liquid crystal display module.

The liquid crystal panel and the backlight assembly may be accommodated at a side portion of a main support structure (or "main support" for short) in which the FPCB having a plurality of light emitting diodes (LEDs) provided thereon is disposed. The main support structure may be formed of a frame mold material having a generally quadrangular shape. In addition to the supported FPCB with its LEDs, the side portion of a main support structure is configured to accommodate a light guide plate (LGP) and one or more optical sheets that are to be disposed in a predetermined relationship relative to the FPCB-mounted LEDs.

The FPCB having the LEDs may be fixed onto the side portion of the main support by using a fixing tape. Also, a double-sided light blocking tape may be provided between the liquid crystal panel and the backlight assembly for affixing together the liquid crystal panel and the backlight assembly.

An end of the FPCB opposite to where the LEDs are mounted may be rotated by 180 degrees (e.g., into a U-shaped configuration) and electrically connected to a backlight driving driver provided at a bottom surface of the backlight unit.

It is desirable to do all of the above in an economical and form factor minimizing way while assuring that the light guide plate (LGP) and the light blocking tape remain in a predetermined relationship relative to the FPCB-mounted LEDs even as the end of the FPCB is bent for connection to the backlight driving drive electronics.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

The present disclosure of invention provides a combination of a backlight assembly and a liquid crystal display that is configured for reducing an undesired light leakage phenomenon by disposing a double-sided adhesive member between a plurality of light emitting diodes located in a flexible printed circuit board but leaving a discontinuity of the material of the adhesive member along high-intensity light emitting pathways of the LEDs.

Further, the present disclosure of invention provides a method of adhering together a panel and a light guide by using one adhesive member to thereby simplify a manufacturing process of a liquid crystal display.

An exemplary embodiment provides a backlight assembly including: a plurality of light emitting diodes (LEDs) configured to emit light; a flexible printed circuit board (FPCB) on which the LEDs are mounted; a light guide disposed to have a surface corresponding to light emitting surfaces of the LEDs; a main support configured to accommodate the LEDs and the light guide therein; and a double-sided adhesive member formed to affix together the FPCB, the main support, and the light guide, wherein one surface of the adhesive member is attached to the FPCB and another adhesive surface thereof is attached to the main support and the light guide, and the adhesive member is formed between the LEDs but not long the high-intensity light emitting pathways of the LEDs.

The adhesive member may not be formed at a first region through which light emitted from the LEDs pass and a second region that is located opposite to the first region.

The adhesive member may be formed to have a quadrangular, trapezoidal, triangular, or circular shape.

The adhesive member may be entirely formed as stripes in a vertically longitudinal direction on a bottom surface of the FPCB.

One portion of the adhesive member may be brought into contact with an upper surface of a side of the main support, and another portion thereof may be brought into contact with an upper surface of a side of the light guide.

The adhesive member may be partially formed in a vertically longitudinal direction as strips on a bottom surface of the FPCB.

The adhesive member may be a pre-patterned double-sided tape or a printed-on and curable fluid adhesive.

Another exemplary embodiment provides a liquid crystal display including: a liquid crystal panel; a plurality of light emitting diodes (LEDs) configured to emit light; a flexible printed circuit board (FPCB) in which the LEDs are mounted; a light guide disposed to have a surface corresponding to light emitting surfaces of the LEDs; a main support configured to accommodate the LEDs and the light guide therein; and an adhesive member formed to fix the FPCB, the main support, the light guide, and the liquid crystal panel, wherein one surface of the adhesive member formed on a bottom surface of the FPCB is attached to the bottom surface of the FPCB, the other surface thereof is attached to the main support and the light guide, and the adhesive member is formed between the LEDs, and wherein the adhesive member covers a side surface and a top surface of the FPCB.

The adhesive member may be formed as a folded over single unit on a top surface and a bottom surface of the FPCB.

The adhesive member formed on the bottom surface of the FPCB may be formed to have a triangular, quadrangular, or circular shape.

One surface of the adhesive member formed on the top surface of the FPCB may be attached to the top surface of the FPCB, and the other surface thereof may be attached to the liquid crystal panel.

The adhesive member may be formed on the top surface of the FPCB, and the liquid crystal display may further include a light blocking tape provided between the liquid crystal panel and the main support.

The adhesive member may have a tape shape.

Yet another exemplary embodiment provides a liquid crystal display including: a liquid crystal panel; a plurality of light emitting diodes (LEDs) configured to emit light; a flexible printed circuit board (FPCB) in which the LEDs are mounted; a light guide disposed to have a surface corresponding to light emitting surfaces of the LEDs; a main support configured to accommodate the LEDs and the light guide therein; a light blocking tape configured to fix a top surface of the FPCB and the liquid crystal panel; and an adhesive member formed to fix a bottom surface of the FPCB, the main support, and the light guide, wherein one surface of the adhesive member is attached to the FPCB, the other surface thereof is attached to the main support and the light guide, and the adhesive member is formed between the LEDs.

Yet another exemplary embodiment provides a manufacturing method of a backlight assembly, including: disposing a plurality of light emitting diodes (LEDs) in a flexible printed circuit board (FPCB); disposing a mask on the FPCB, the mask having holes of predetermined shapes formed at a position at which an adhesive member is to be printed on the FPCB in which the LEDs are disposed; and coating the adhesive member on the mask.

Yet another exemplary embodiment provides a manufacturing method of a backlight assembly, including: disposing a plurality of LEDs on an FPCB; printing an adhesive member at a position at which the adhesive member is to be printed on the FPCB in which the LEDs are disposed on a release liner; printing the adhesive member on the FPCB by covering the release liner on which the adhesive member is printed on the FPCB in which the LEDs are disposed; and removing the release liner.

The manufacturing method may further include: forming a protective film on the release liner and the adhesive member; and removing the protective film after the printing of the adhesive member at the position at which the adhesive member is to be printed on the FPCB.

In accordance with the exemplary embodiments, it is possible to provide a backlight assembly and a liquid crystal display including the same, which can reduce an undesired light leakage phenomenon by disposing an adhesive member between a plurality of LEDs located in an FPCB but not continuously along a light outputting pathway between a light emitting diode and a light guide in a backlight unit.

It is also possible to adhere a panel and a light guide by using one adhesive member to thereby simplify a manufacturing process of a liquid crystal display.

DETAILED DESCRIPTION OF THE EMBODIMENTS

Figure 1:
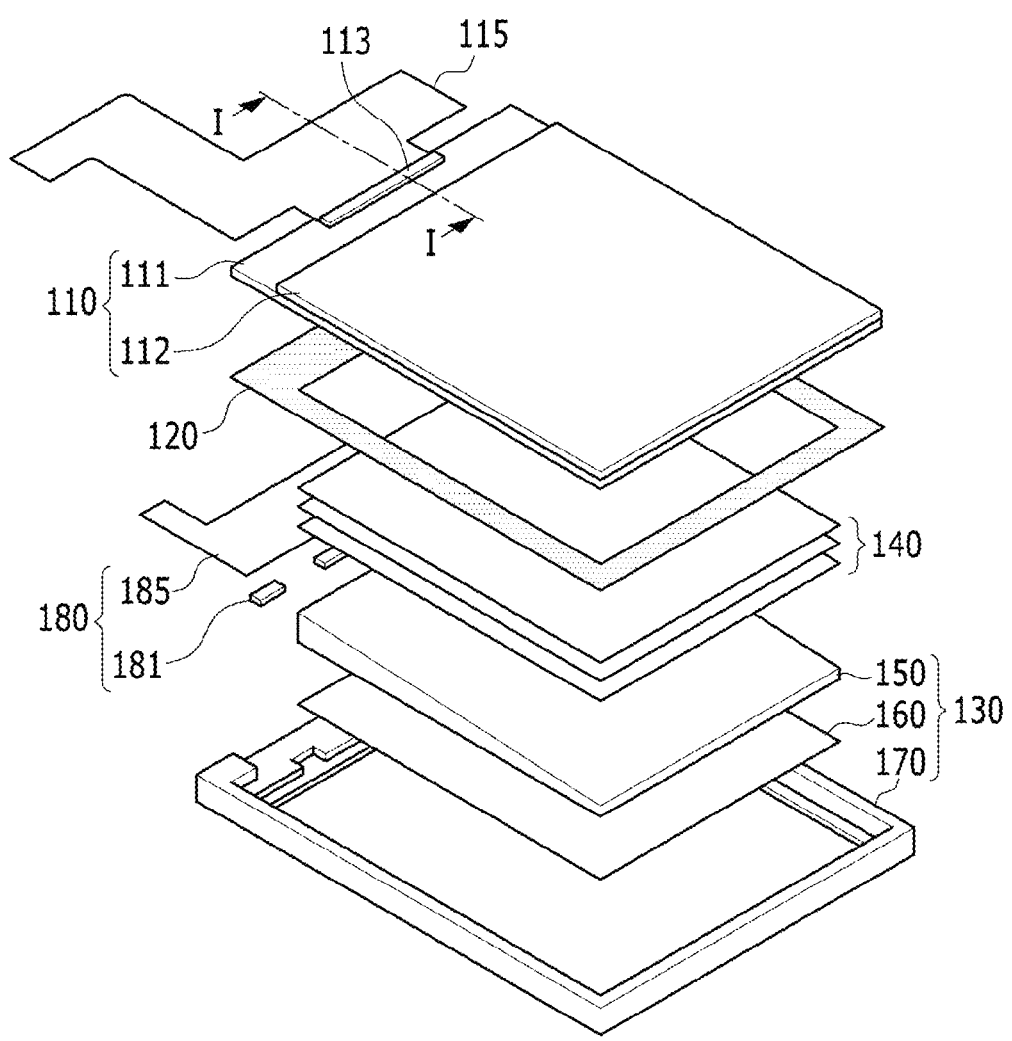
FIG. 1 is an exploded perspective view showing a combination of a liquid crystal display assembly and backlighting assembly in accordance with an exemplary embodiment in accordance with the present disclosure of invention.

Hereinafter, exemplary embodiments in accordance with the present disclosure of invention will be described in detail with reference to the attached drawings such that the present teachings can be easily put into practice by those skilled in the art. As those skilled in the art would realize in light of this disclosure, the described embodiments may be modified in various different ways, all without departing from the spirit or scope of the present teachings.

In the drawings, the thickness of layers, films, panels, regions, etc., are exaggerated for clarity. Like reference numerals designate like elements throughout the specification. When a first part of a layer, a film, a plate, or the like is described as being arranged "on" or "over" a second part, this indicates that the first part is arranged on or over the second part directly or with a third part therebetween without the limitation to the upper side thereof on the basis of the gravity direction. In contrast, when an element is referred to as being "directly on" another element, there are no intervening elements present.

A backlight assembly and a liquid crystal display including the same will now be described with reference to the accompanying drawings in accordance with a first exemplary embodiment of the present disclosure.

First, a backlight assembly and a liquid crystal display including the same will be described with reference to FIG. 1 to FIG. 3 in accordance with an exemplary embodiment.

FIG. 1 is an exploded perspective view showing a liquid crystal display in accordance with the first exemplary embodiment. FIG. 2 is a perspective view showing a flexible printed circuit board and an adhesive member. FIG. 3 is a cross-sectional view showing a liquid crystal display taken along a line I-I of FIG. 1.

Referring to FIG. 1, the liquid crystal display of the present exemplary embodiment includes a liquid crystal panel 110 on which an image is to be displayed, and a backlight assembly 130 disposed at a bottom portion of the liquid crystal panel 110 to supply light to the latter.

A first flexible printed circuit board (FPCB) 115 to which a data signal and a control signal are applied from the outside is provided at an edge of the liquid crystal panel 110.

The first FPCB 115 may be a substrate formed of a heat-resistant plastic film such as a flexible material, e.g., polyester (PET) or polyimide (PI) as a circuit board in which complex circuits are formed on the flexible insulation film. The FPCB 115 has been frequently used for small liquid crystal display modules since it can take useful advantage of available space, for example by providing three-dimensional wiring thanks to its flexibility.

In the liquid crystal panel 110, a driving driver (e.g., integrated circuit) 113 is mounted at a region that is grounded with the first flexible printed circuit board 115. The liquid crystal panel 110 receives an outside signal from the first flexible printed circuit board 115, and the driving driver 113 generates a driving signal for driving the liquid crystal panel 110 by using the outside signal.

The liquid crystal panel 110 includes a thin film transistor (TFT) substrate 111, a color filter substrate 112 provided to face the thin film transistor substrate 111, and a liquid crystal (not shown) interposed therebetween.

One end of the thin film transistor substrate 111 is extended to be longer than that of the color filter substrate 112. Accordingly, the chip-shaped driving driver 113 may be mounted at an end of the thin film transistor substrate 111.

The backlight assembly 130 disposed at the bottom surface of the liquid crystal panel 110 includes a light source unit 180 disposed at a side portion thereof, a light guide 150 disposed to have a light receiving surface aligned opposite to a light emitting surface of the light source unit 180, where the light guide 150 (LGP) is configured to convert point sourced light into diffused surface light, optical sheets 140 disposed on the light guide to further diffuse and/or otherwise improve characteristics of the light emitted from the light guide 150, and a reflective sheet 160 disposed at the bottom surface of the light guide 150 to reflect light emitted in a downward direction of the light guide 150 back toward the liquid crystal panel 110.

The backlight assembly 130 further includes a main support 170 formed of a quadrangular frame mold material and shaped to accommodate the light source unit 180, the light guide 150, the optical sheets 140, and the reflective sheet 160 therein.

A double-sided light blocking tape 120 is disposed on the main support 170 and is used to affix together the light source unit 180, the light guide 150, the optical sheets 140, and the reflective sheet 160 so as to thereby prevent their breakaway from the main support 170, and to further affix them relative to the liquid crystal panel 110.

The light blocking tape 120 has opposite surfaces coated with an adhesive to affix together the backlight assembly 130 and the liquid crystal panel 110, and is entirely formed of a black colored or otherwise opaque material so as to prevent light emitted from the backlight assembly 130 from leaking to the outside.

When the backlight assembly 130 and the liquid crystal panel 110 are assembled by using the light blocking tape 120 as part of the assembly process, the FPCB 115 may be bent 180 degrees to have a portion thereof disposed at a bottom surface of the main support 170.

The light guide 150 may be made of polymethylmethacrylate (PMMA). Further, although not shown, the light guide 150 may be formed to have a wedge shape with its thickness becoming thinner when moving away from an incident surface thereof on which the light source unit 180 is disposed and toward a more distant portion.

A prism pattern may be formed on the bottom surface of the light guide 150 to reflect incident light toward the optical sheets 140.

The optical sheets 140 may include a diffuser sheet for diffusing light, a concentrating sheet for concentrating light, and a protecting sheet for protecting the diffuser sheet and the concentrating sheet from contaminants and/or scratching.

The light source unit 180 includes a second FPCB 185 in which wiring is formed, and a plurality of LEDs 181 disposed at a predetermined distance from each other on a bottom surface of the second FPCB 185.

The second FPCB 185 is a substrate formed of a heat-resistant plastic film such as a flexible material, e.g., polyester (PET) or polyimide (PI) as a circuit board in which complex circuits are formed on the flexible insulation film.

A double-sided and patterned adhesive member 200 is provided at the bottom surface of the second FPCB 185 to correspond to surface portions of the second FPCB 185 other than surface regions at which the LEDs 181 are mounted and other than surface regions through which light emitted from the LEDs 181 is to pass on its way to the LGP 150. The surface regions at which the double-sided and patterned adhesive member 200 is present may be used to alignably affix the second FPCB 185 to the main support 170 and to the light guide 150 so that these initially separate components are held together.

A problem that is present in a typical small liquid crystal display is that of light leakage through the affixing adhesive, especially where the adhesive is a light conducting one that is located between the light guide plate and the FPCB on which the LEDs are mounted. In such a case, light emitted from the LEDs can pass through the light conducting adhesive region, thereby creating the problem of light leakage coming out at locations of the adhesive region.

In contrast to the above typically organization, the adhesive member 200 of the present exemplary embodiment is patterned to have leakage-reducing or minimizing grooves 203 formed at the surface regions at which the LEDs 181 are disposed and at the surface regions through which light directly emitted from the LEDs 181 passes so that such directly emitted light is not easily coupled into the layer of the adhesive member 200. In other words, the adhesive member 200 is not formed so as to have a parasitic light entrance structure at surface regions at which the LEDs 181 are disposed and at surface regions through which the high intensity light emitted from the LEDs 181 directly passes on its way to the LPG 150. On the other hand, for the sake of enhanced adhesion between the second FPCB 185 and the other components to which the second FPCB 185 is to be affixed to, the patterned adhesive member 200 does have portions formed and disposed in surface regions between where the LEDs and their high intensity light output paths are located along the bottom surface of the second FPCB 185.

The adhesive member 200 may be patterned to have sections each of a quadrangular shape between the LEDs 181, but the shape of each of the interposed sections of the adhesive member 200 may instead include, and merely as an example, a triangle, a circle, and/or a trapezoid without being limited thereto. Specifically, the adhesive member 200 may be formed to have interposed sections between the LEDs 181 where the sections extend entirely in a vertically longitudinal direction on the bottom surface of the second FPCB 185, as shown for example in FIG. 2. Alternatively the adhesive member 200 may be formed at regions on the top surface of the second FPCB 185 (see briefly FIG. 6) as well as having spaced apart sections on the bottom surface of the second FPCB 185 but interposed between the LEDs 181.

One portion of the adhesive member 200 is brought into contact with an upper surface of a side portion of the main support 170, and another portion of the adhesive member 200 is brought into contact with an upper surface portion at a side edge of the light guide plate (LGP) 150 such that the adhesive member 200 simultaneously bonds to the main support 170 and to the LGP 150 and thus affixes the second FPCB 185 to both of them. The double-sided adhesive member 200 has opposite surfaces coated with adhesive where one of the opposed surfaces thereof is brought into adhering contact with the second FPCB 185 and the other of the opposed surfaces thereof is brought into adhering contact with both the light guide 150 and the main support 170 so as to thereby affix the three components one to the next.

A double-sided affixing tape and/or a curable fluid adhesive may be employed as the adhesive member 200, but it is not limited thereto.

Without being bound to any specific theory, it is believed that light leakage through the adhesive member is high when the adhesive member defines a continuous light conducting pathway composed continuously of the material of the adhesive member while light leakage is substantially reduced when one or more air-filled grooves such as 203 interrupt the coupling of leakage light particularly along the high-intensity light emitting pathways of the LEDs 181. By keeping the light emitting pathways of the LEDs 181 substantially clear of a continuum of the material of the adhesive member 200, light leakage is substantially reduced while the adhesive affixing function of the adhesive member is not substantially degraded.

Hereinafter, a backlight assembly and a liquid crystal display including the same will be described in detail with reference to FIG. 4 to FIG. 6 in accordance with another exemplary embodiment in accordance with the present disclosure of invention.

Figure 4:
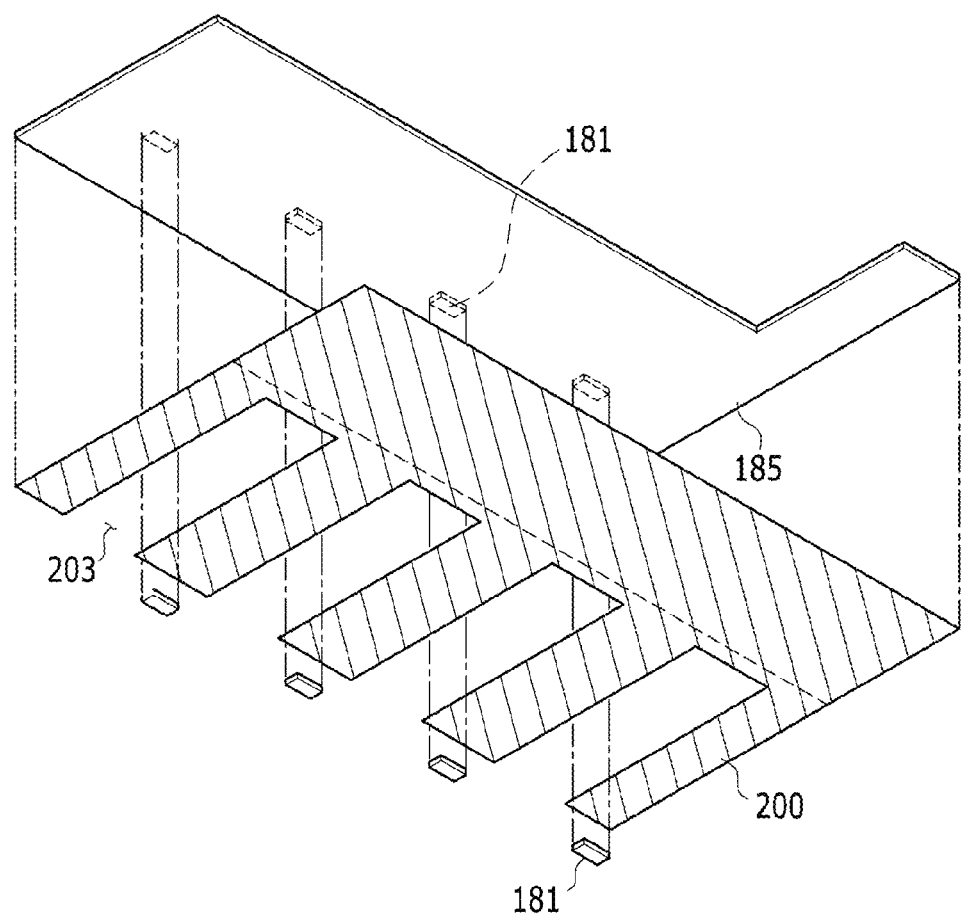
FIG. 4 is a perspective view showing a flexible printed circuit board (FPCB) and a patterned, double-sided adhesive member in accordance with another exemplary embodiment.

FIG. 4 is a perspective view showing a flexible printed circuit board 185 and a patterned adhesive member 200 in accordance with another exemplary embodiment. FIG. 5 is a perspective view showing a coupled state of the flexible printed circuit board and the adhesive member in accordance with the present exemplary embodiment. FIG. 6 is a cross-sectional view showing a liquid crystal display taken along a line I-I of FIG. 1 in accordance with this exemplary embodiment when the end of the adhesive member 200 distal from the LEDs is folded over along the fold line of FIG. 4 so as to define a U-shaped layer disposed about both the bottom and top surfaces of the second FPCB 185.

Figure 2:
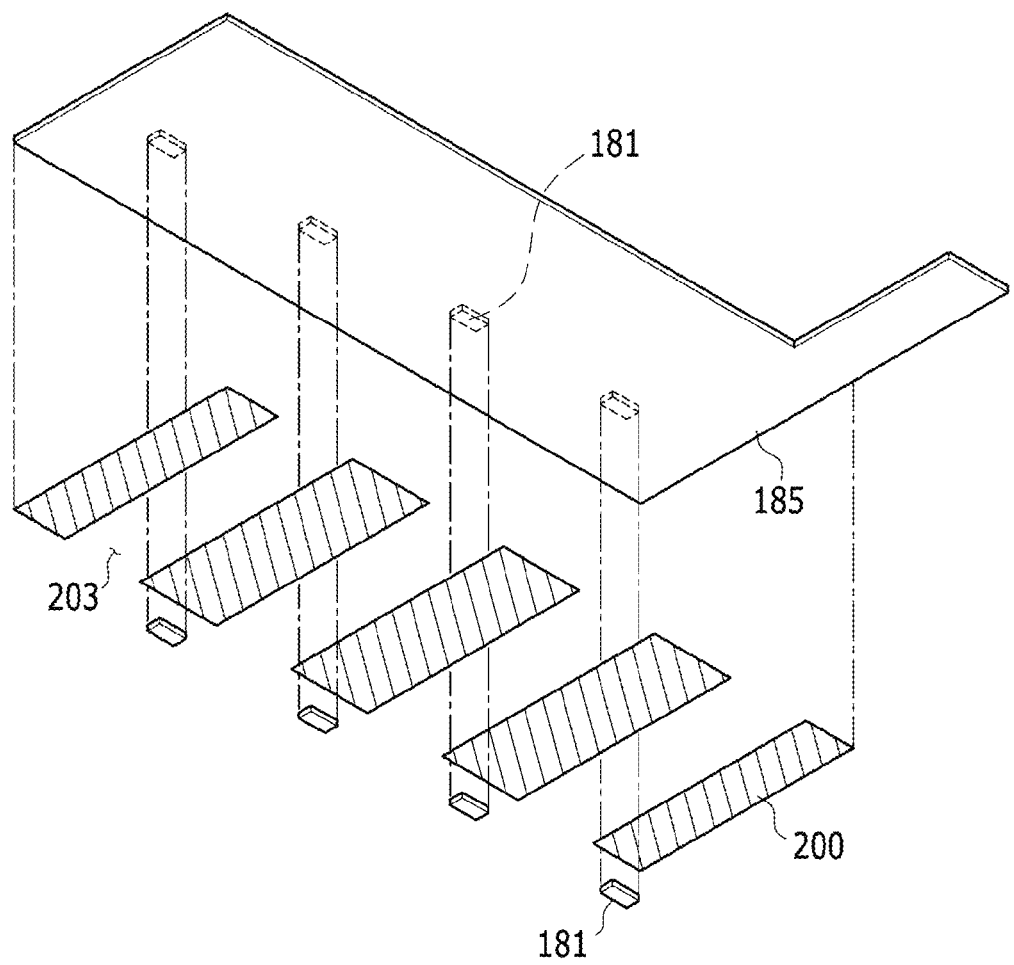
FIG. 2 is a perspective view showing a flexible printed circuit board (FPCB) and a patterned, double-sided adhesive member used within the combination of FIG. 1.
Figure 3:
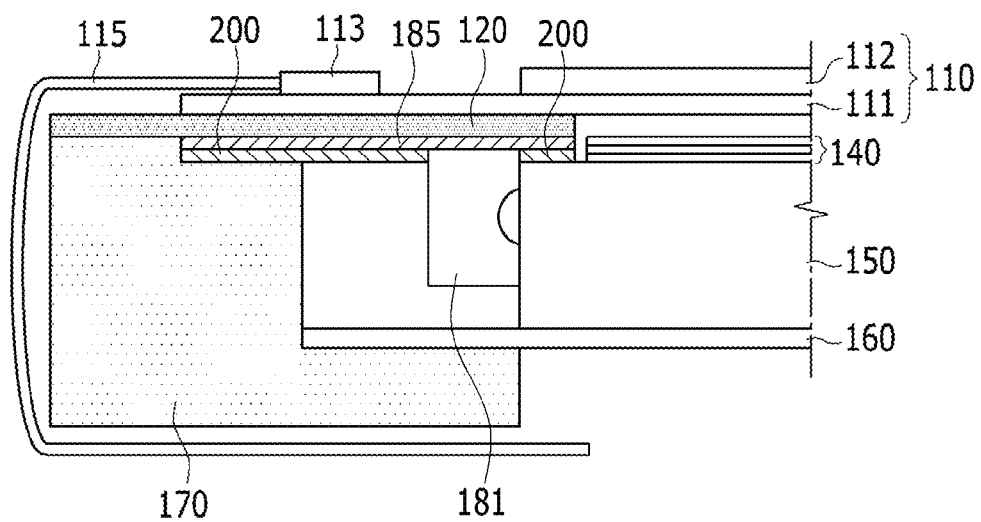
FIG. 3 is a cross-sectional view taken along a line I-I of FIG. 1.
Figure 5:
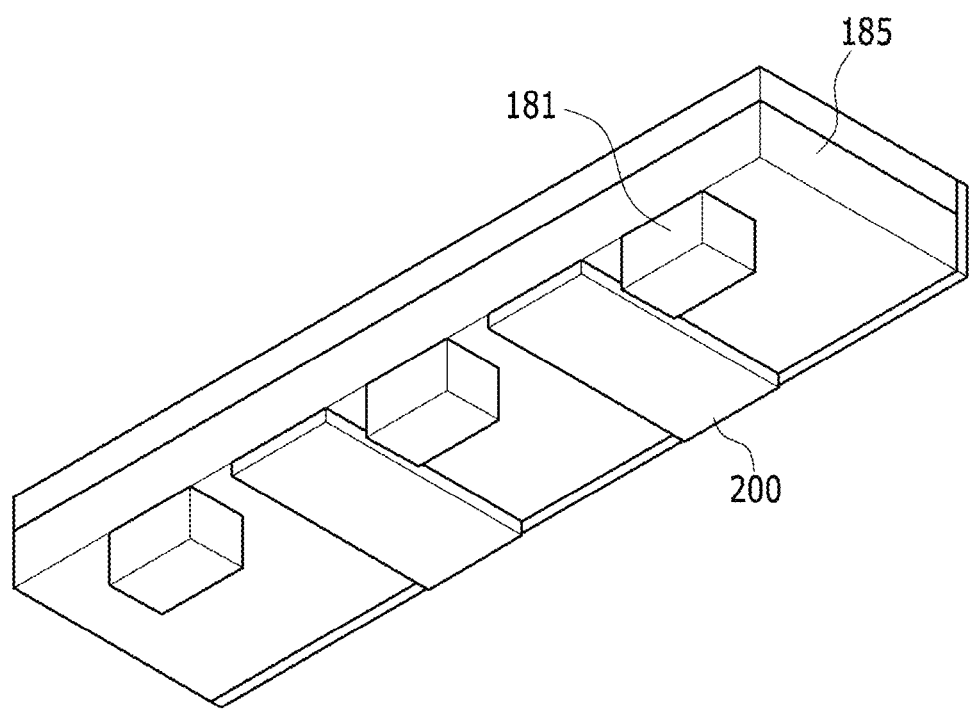
FIG. 5 is a perspective view showing a coupled state of the flexible printed circuit board and the adhesive member in accordance with an exemplary embodiment.
Figure 6:
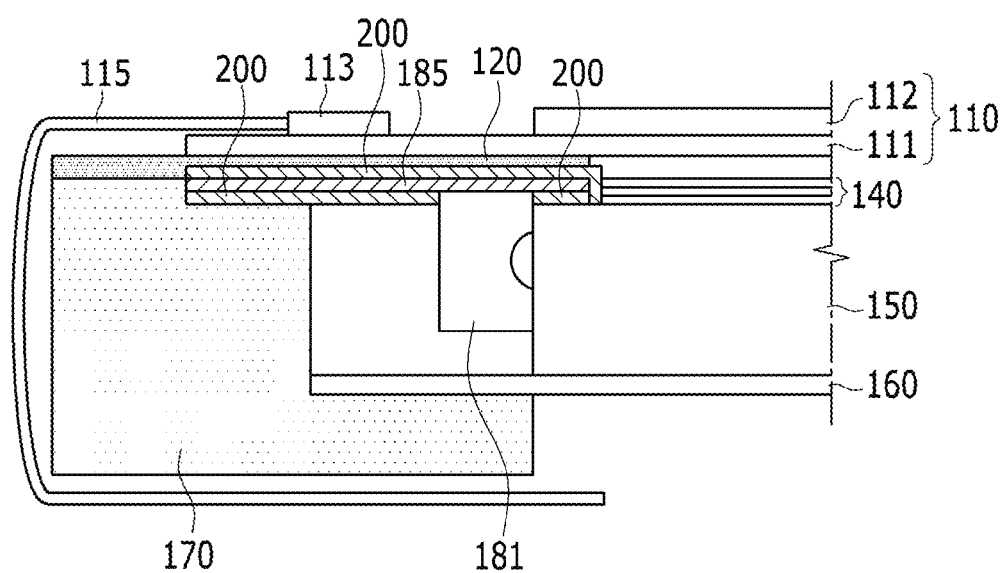
FIG. 6 is a cross-sectional view showing a liquid crystal display taken along a line I-I of FIG. 1 in accordance with a further exemplary embodiment.

The backlight assembly and the liquid crystal display including the same shown in FIG. 4 to FIG. 6 is substantially the same as that shown in FIG. 1 to FIG. 3 except for the adhesive member 200 being disposed on both upper and lower surfaces of the second FPCB 185, and thus no repeated description will be provided of the parts that remain the same.

Referring to FIG. 4 to FIG. 6, the light source unit 180 includes the second FPCB 185 in which printed wiring is formed, and on which the LEDs 181 are disposed at a predetermined distance from each other and along the bottom surface of the second FPCB 185.

The second FPCB 185 is a substrate formed of a heat-resistant plastic film such as a flexible material, e.g., polyester (PET) or polyimide (PI) as a circuit board in which complex circuits are formed on the flexible insulation film.

As best seen in FIG. 5, spaced apart sections of the adhesive member 200 are provided on the bottom surface of the second FPCB 185 at surface portions other than the regions at which the LEDs 181 are disposed and other than the regions through which the high intensity light emitted directly from the LEDs 181 passes. These spaced apart sections of the adhesive member 200 help to affix the second FPCB 185 simultaneously to both the main support 170 and to the light guide 150 while at the same time not providing a path for high intensity leakage light to easily enter into the layer of the adhesive member 200.

More specifically, the adhesive member 200 of the present exemplary embodiment has a structure in which grooves 203 are formed at the regions at which the LEDs 181 are disposed and at the regions through which high intensity light emitted from the LEDs 181 passes where the not-present adhesive layer material of the grooves 203 does not provide an optical entrance mechanism for allowing significant portions of the high intensity light emitted from the LEDs 181 to enter into the layer of the adhesive member 200. In other words, the adhesive member 200 is not formed at the regions at which the LEDs 181 are disposed and at the regions through which the light emitted from the LEDs 181 directly passes, but is formed and disposed between the LEDs located on the bottom surface of the second FPCB 185.

The spaced apart bottom sections of the adhesive member 200 may be formed each in a quadrangular shape between the adjacent LEDs 181. Alternatively, the sections of the adhesive member 200 may be formed between the LEDs 181 entirely as strips extending in a vertical direction on the bottom surface of the second FPCB 185 and looping over to the top surface of the second FPCB 185.

Herein, the adhesive member 200 disposed between the LEDs 181 on the bottom surface of the second FPCB 185 has a structure to extend in such a way so as to entirely cover a side surface and a top surface of the second FPCB 185.

One portion of the adhesive member 200 is brought into contact with an upper surface of a side portion of the main support 170, and another portion thereof is brought into contact with an upper surface at a side portion of the light guide 150. Further, a portion of the adhesive member 200 which covers the top surface of the second FPCB 185 may be brought into cross-adhering contact with the light blocking tape 120 disposed at the upper portion of the second FPCB 185.

The adhesive member 200 has opposite surfaces coated with adhesive, so that the liquid crystal panel 110 may be directly affixed to the top surface of the second PCB 185 by way of the folded over adhesive member 200 along with the affixing of the separate components 170 and 150 of the backlight assembly 130 to the second PCB 185 and therethrough to each other. Typically, opposite surfaces of the light blocking tape 120 are coated with adhesive to fix together just a corresponding part of the backlight assembly 130 and the liquid crystal panel 110. In contrast, in accordance with the present exemplary embodiment, the adhesive member 200 can be additionally disposed at the top surface of the second FPCB 185 to perform this function in combination with the light blocking tape 120.

Specifically, the adhesive member 200 has opposite surfaces coated with adhesive, so that one surface of the adhesive member 200 disposed on the bottom surface of the second FPCB 185 is brought into contact with the bottom surface of the second FPCB 185 and the other surface thereof is brought into contact with the light guide 150 and the main support 170, and one surface of the adhesive member 200 disposed on the top surface of the second FPCB 185 is additionally brought into contact with the top surface of the second FPCB 185 and the other surface thereof is directly brought into contact with the light blocking tape 120 and/or the liquid crystal panel 110.

A double-sided affixing tape and/or a curable fluid adhesive may be employed in the adhesive member 200 used in the backlight assembly 130 of the immediately above described exemplary embodiment.

Hereinafter, a combined backlight assembly and a liquid crystal display including the same but with slightly modified, inter-LED sections of the adhesive member 200 will be described in detail with reference to FIG. 7 as being in accordance with yet another exemplary embodiment.

Figure 7:
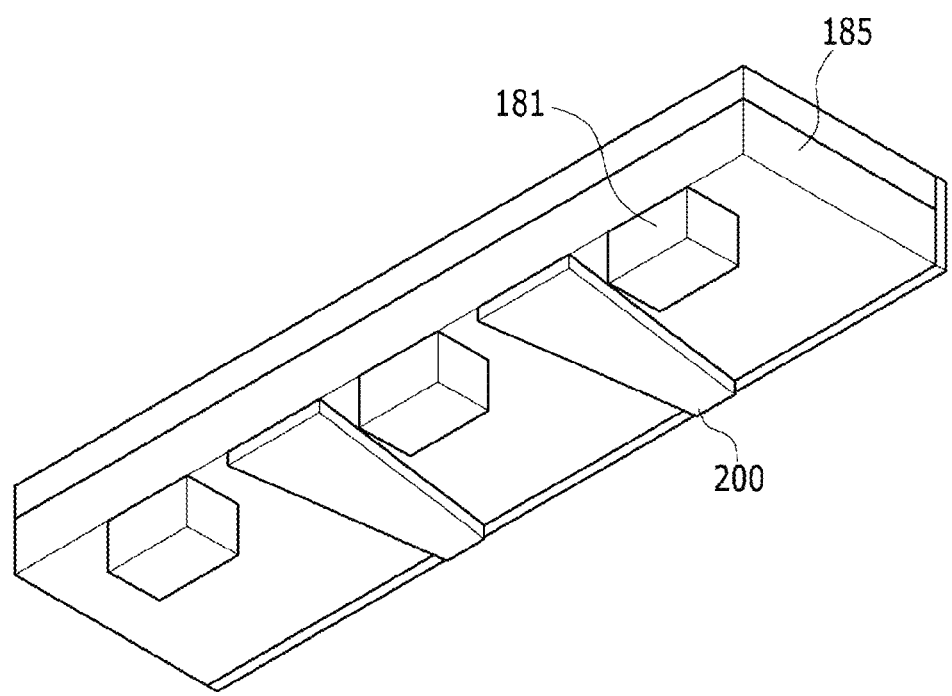
FIG. 7 is a perspective view showing a coupled state of the flexible printed circuit board and the adhesive member in accordance with a first modification.

FIG. 7 is a perspective view showing a coupled state of the flexible printed circuit board and the adhesive member in accordance with a first modification.

The backlight assembly and the liquid crystal display including the same shown in FIG. 7 is substantially the same as that shown in FIG. 4 to FIG. 6 except for the shape of the inter-LED sections of the adhesive member 200 that are disposed on the bottom surface of the second FPCB 185, and thus no repeated description will be provided.

As shown in FIG. 7, the adhesive member 200 may be disposed on the bottom surface of the second FPCB 185 in sections each of a trapezoidal shape instead of the quadrangular shape shown in FIG. 4 to FIG. 6 in which the adhesive member 200 is disposed. The grooves between the trapezoidally shaped inter-LED sections of the adhesive member 200 of FIG. 7 allow the high intensity light emitted from the LEDs to fan out as it passes through the grooves toward the light incident edge of the LGP 150 (not shown).

Hereinafter, a backlight assembly and a liquid crystal display including the same will be described in detail with reference to FIG. 8 in accordance with yet another exemplary embodiment.

Figure 8:
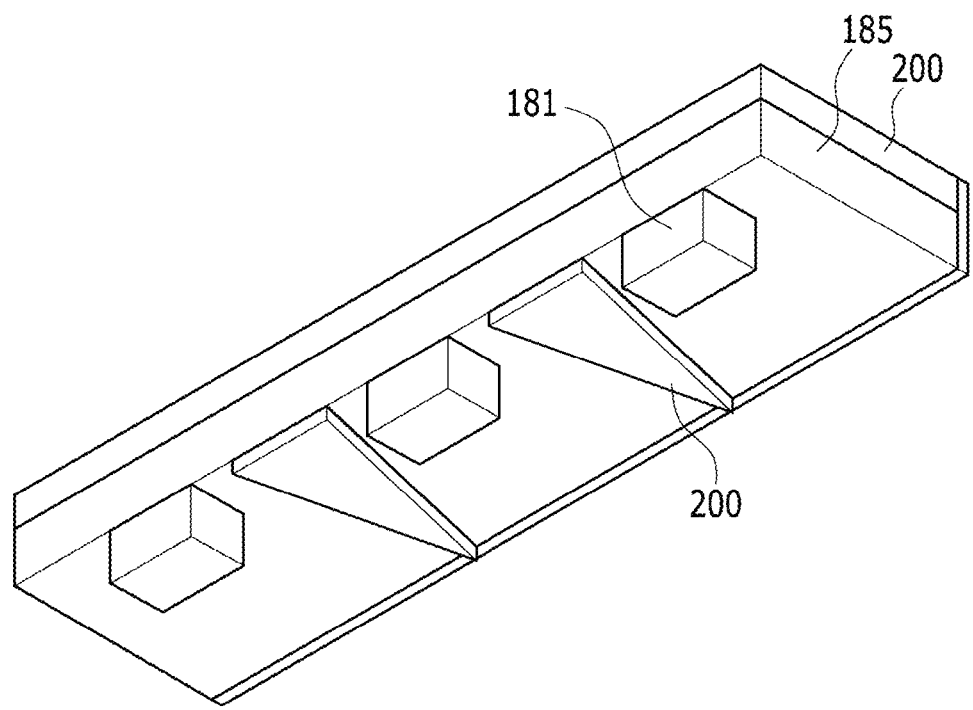
FIG. 8 is a perspective view showing a coupled state of the flexible printed circuit board and the adhesive member in accordance with a second modification.

FIG. 8 is a perspective view showing a coupled state of the flexible printed circuit board and the adhesive member in accordance with a second modification.

The backlight assembly and the liquid crystal display including the same shown in FIG. 8 is substantially the same as that shown in FIG. 4 to FIG. 6 except for the shape of the inter-LED sections of the adhesive member 200 disposed on the bottom surface of the second FPCB 185, and thus no repeated description will be provided.

As shown in FIG. 8, the patterned adhesive member 200 may be disposed on the bottom surface of the second FPCB 185 to have spaced apart inter-LED sections each of a triangular shape instead of the quadrangular shape shown in FIG. 4 to FIG. 6 in which the adhesive member 200 is disposed. The grooves between the triangularly shaped inter-LED sections of the adhesive member 200 of FIG. 8 allow the high intensity light emitted from the LEDs to fan out even more as it passes through the grooves toward the light incident edge of the LGP 150 (not shown). The triangle shapes may be formed by cutting away one or more side parts of the trapezoids of FIG. 7.

Hereinafter, a manufacturing method of a backlight assembly will be described in detail with reference to FIG. 9 in accordance with an exemplary embodiment.

Figure 9:
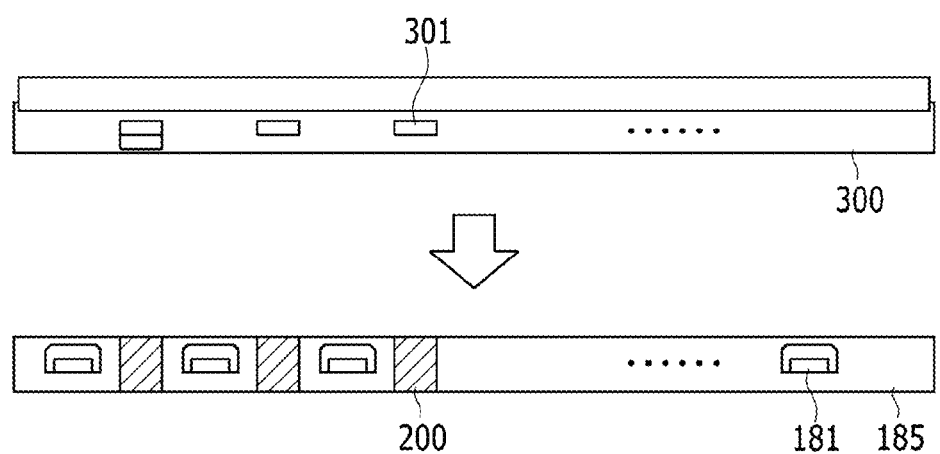
FIG. 9 shows a manufacturing process for a backlight assembly in accordance with an exemplary embodiment.

FIG. 9 shows a manufacturing process of the backlight assembly in accordance with the present exemplary embodiment.

Referring to FIG. 9, the FPCB 185 in which the LEDs 181 are disposed is disposed at the bottom, and a mask 300 having holes 301 formed at positions at which striped sections of the adhesive member 200 will be printed (e.g., as ink jet deposited adhesive fluid) are located above the second flexible printed circuit board 185.

Herein, the holes 301 formed in the mask 300 may be formed in a shape of a quadrangle, a triangle, a circle or the like according to a to-be-printed shape of the adhesive member 200, and may be variously formed according to positions and shapes of the adhesive member 200.

Thereafter, the adhesive member 200 is printed onto the bottom surface of the second FPCB 185 through the holes 301 formed in the mask 300 by coating the material of the adhesive member 200 on a top surface of the mask 300, thereby completing a backlight assembly in accordance with this exemplary embodiment.

Hereinafter, a backlight assembly will be described in detail with reference to FIG. 10 in accordance with an exemplary embodiment.

Figure 10:
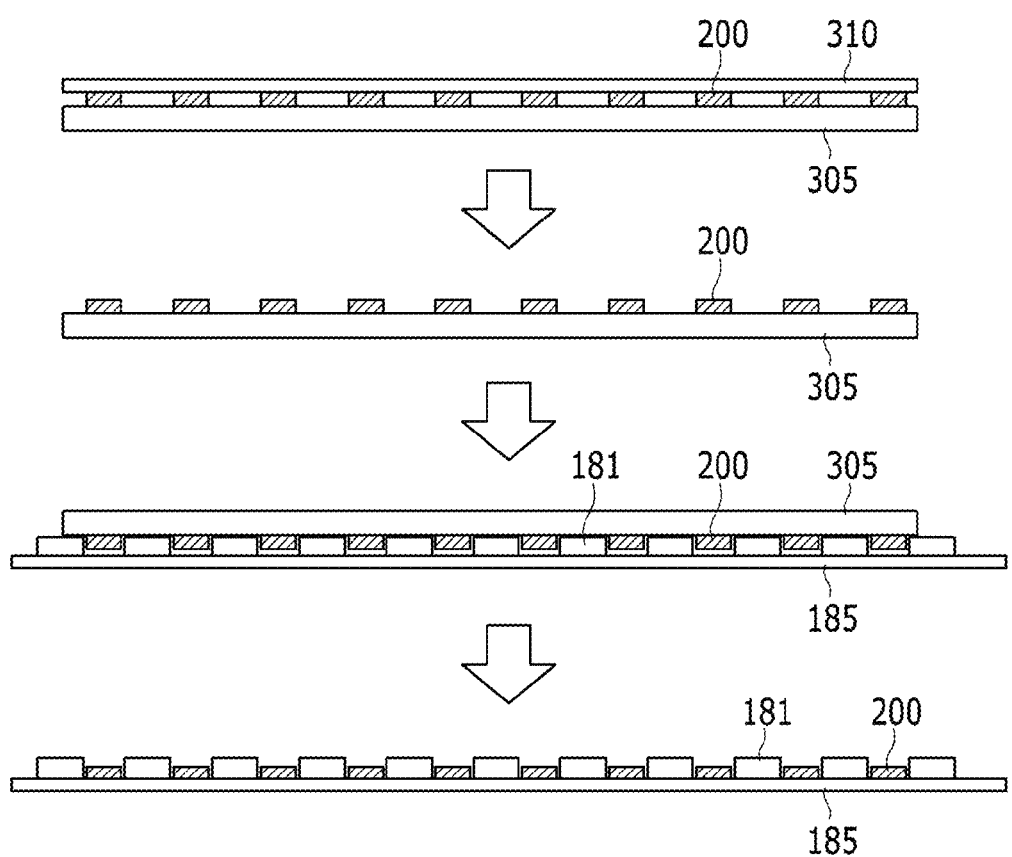
FIG. 10 shows another manufacturing process for a backlight assembly in accordance with another exemplary embodiment.

FIG. 10 shows another manufacturing process of the backlight assembly in accordance with the present exemplary embodiment.

Referring to FIG. 10, the adhesive member 200 is printed on a top surface of a release liner 305 to correspond to a position of the adhesive member 200 to be printed on the second FPCB 185, and a top surface of the adhesive member 200 is covered with a protective film 310.

In this case, when the adhesive member 200 is directly printed on the FPCB 185, the protective film 310 may not be attached thereon.

Then, the protective film 310 is removed. Thereafter, the adhesive member 200 is printed on the FPCB 185 with its desired patterned shapes by covering the release liner 305 having the adhesive member 200 printed on the top surface thereof on the FPCB 185, and then the release liner 305 is removed (e.g., by a thermal release process) to thereby complete the backlight assembly in accordance with the present exemplary embodiment.

It was tested whether a light leakage phenomenon can be reduced by applying the backlight assembly of the present exemplary embodiment to a liquid crystal display in order to examine an effect of reducing light leakage when applying the backlight assembly 130 in which the adhesive member 200 is disposed to define grooves 203 where the LEDs 181 are disposed on the bottom surface of the second FPCB 185. The test was performed by applying a backlight assembly in which the adhesive member 200 is disposed also along the light emitting pathways of the LEDs 181 to a first part of the liquid crystal display as a comparative example, and applying the backlight assembly of the present exemplary embodiment to a second part of the liquid crystal display. This result is shown in FIG. 11.

Figure 11:
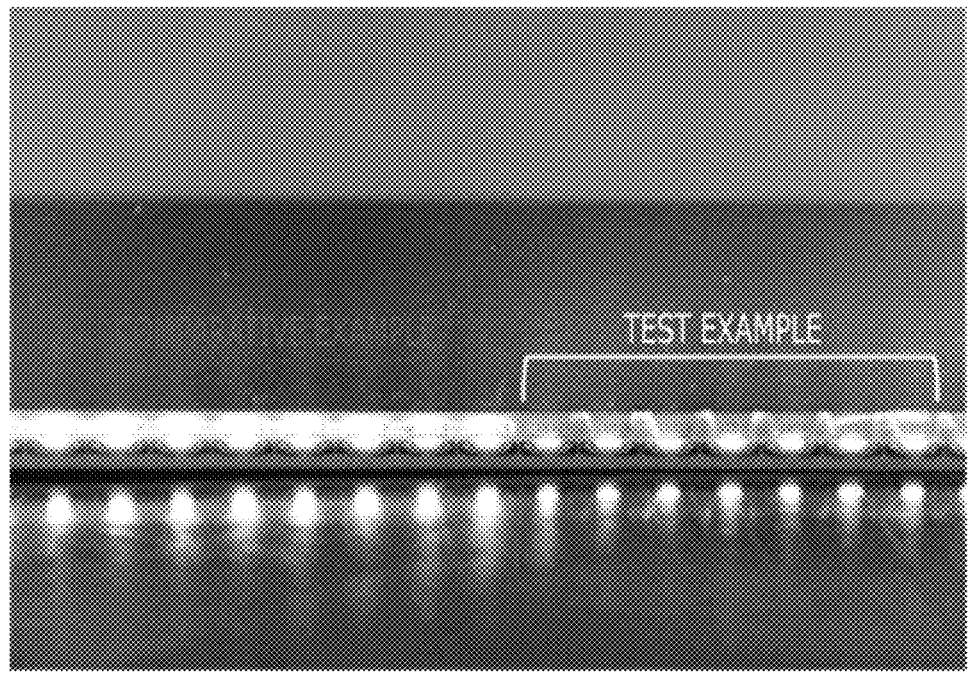
FIG. 11 is a comparative photographic view showing a light leakage phenomenon of a liquid crystal display to which a backlight unit is applied in accordance with an exemplary embodiment of the present disclosure.

FIG. 11 is a comparatively photographed view showing the light leakage phenomenon of a liquid crystal display to which a backlight unit is applied in accordance with the exemplary embodiment of the present disclosure of invention.

As shown in FIG. 11, it is seen that the light leakage phenomenon is remarkably reduced on the right side of the photograph when outer appearances of the first part and the second part of the liquid crystal display are compared in the case that the adhesive member 200 is disposed between the LEDs 181 and the comparative example.

Further, it was tested whether incident light efficiency can be improved by applying the backlight assembly of the present exemplary embodiment to a liquid crystal display in order to examine an effect of improving the incident light efficiency when applying the backlight assembly 130 in which the adhesive member 200 is disposed between the LEDs 181 disposed on the bottom surface of the second FPCB 185. As a comparative example, an incident light efficiency of a liquid crystal display applied with a backlight unit in which the adhesive member 200 is also disposed along the light emitting pathways of the LEDs 181 was also measured. This result is shown by the plots of FIG. 12.

Figure 12:
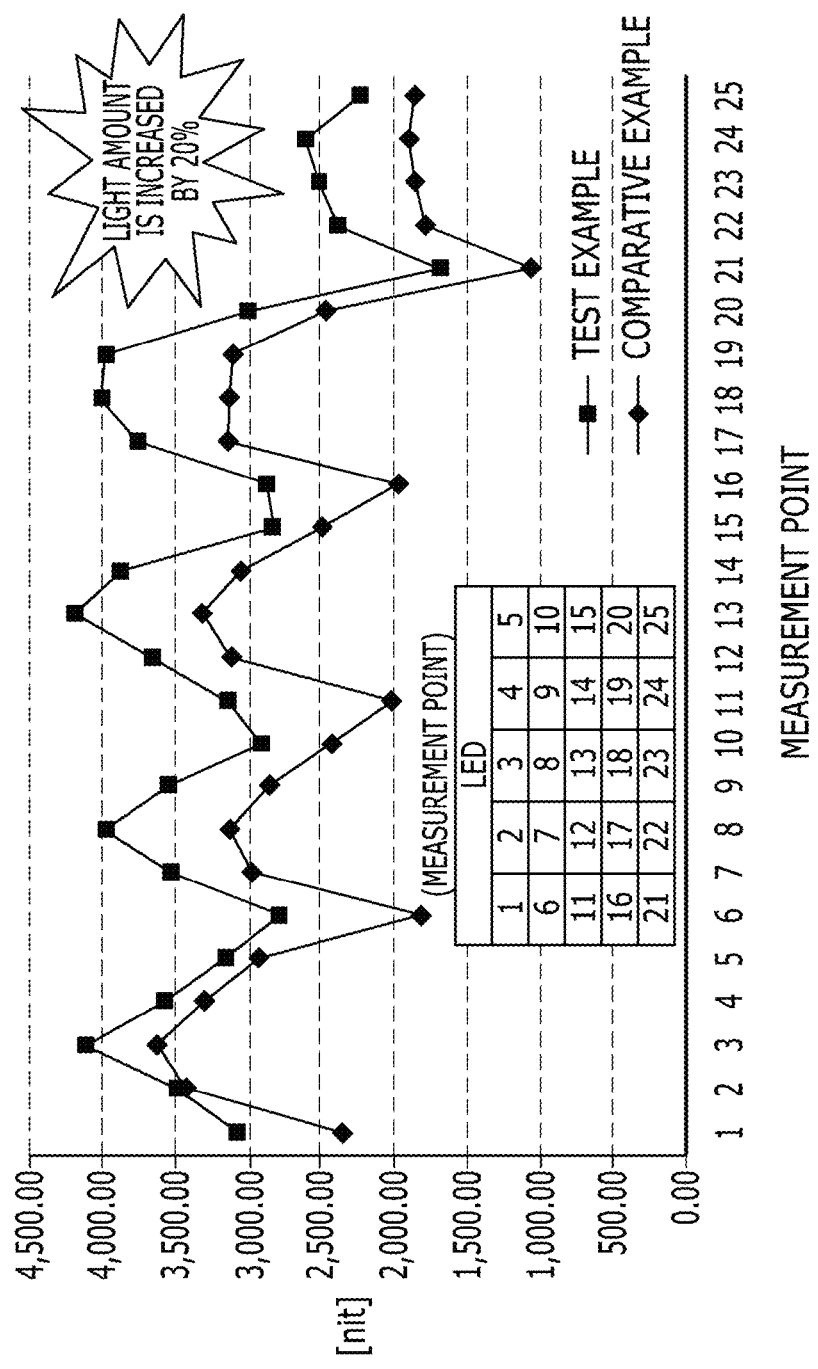
FIG. 12 is a graph showing measured incident light efficiency of the liquid crystal display to which the backlight unit is applied in accordance with the present exemplary embodiment.

FIG. 12 is a graph showing the measured incident light efficiency of the liquid crystal display to which the backlight unit is applied in accordance with the present exemplary embodiment.

The horizontal axis of the graph shown in FIG. 12 indicates each measurement point of the liquid crystal display, and the vertical axis indicates a light amount.

As shown in FIG. 12, it is seen that the light amounts at most of the measurement points are increased by about 20% on average when the backlight assembly of the present exemplary embodiment is used as compared with the comparative example. Since there is less light leakage by keeping the light emitting pathways of the LEDs 181 substantially clear of the adhesive member 200, the light output of the same embodiment is improved as is seen in FIG. 12.

Furthermore, it was tested whether a color coordinate deviation can be reduced by applying the backlight assembly of the present exemplary embodiment to a liquid crystal display in order to examine an effect of reducing the color coordinate deviation when applying the backlight assembly 130 in which the adhesive member 200 is disposed between the LEDs 181 disposed on the bottom surface of the second FPCB 185. As a comparative example, a color coordinate deviation of a liquid crystal display applied with a backlight unit in which the adhesive member 200 is disposed in a light emitting direction of the LEDs 181 was also measured. This result is shown in FIG. 13.

Figure 13:
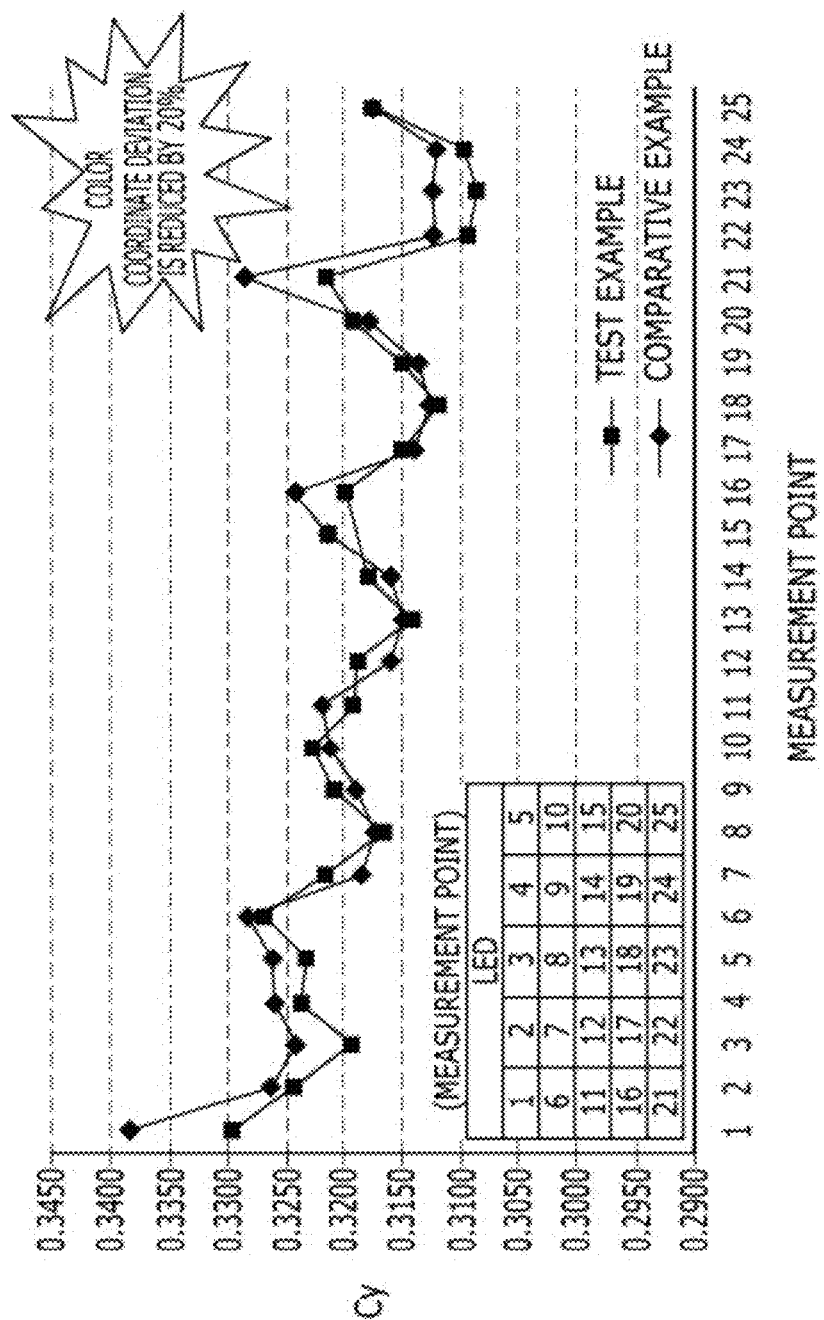
FIG. 13 is a graph showing a measured color coordinate deviation of the liquid crystal display to which the backlight unit is applied in accordance with the present exemplary embodiment.

FIG. 13 is a graph showing the measured color coordinate deviation of the liquid crystal display to which the backlight unit is applied in accordance with the present exemplary embodiment.

The horizontal axis of the graph shown in FIG. 13 indicates each measurement point of the liquid crystal display, and the vertical axis indicates a color coordinate deviation As shown in FIG. 13, it is seen that the color coordinate deviations at most of the measurement points on average are measured as small values of about 20% when the backlight assembly of the present exemplary embodiment is used as compared with the comparative example. Without being bound to any specific theory, it is believed that light leakage through the adhesive member is not uniform across all wavelengths of the visible spectrum. Since there is less light leakage by keeping the light emitting pathways of the LEDs 181 substantially clear of the adhesive member 200, the light output of the same embodiment is more consistent across the wavelengths of the visible spectrum as is seen in FIG. 13.

As described above, in accordance with the exemplary embodiments of the present disclosure, it is possible to provide a backlight assembly and a liquid crystal display including the same which can reduce a light leakage phenomenon by disposing an adhesive member between a plurality of LEDs located in an FPCB instead of between a light emitting diode and a light guide in a backlight unit, and can adhere a panel and a light guide by using one adhesive member to thereby simplify a manufacturing process of a liquid crystal display.

While this disclosure of invention has been described in connection with what is presently considered to be practical exemplary embodiments, it is to be understood that the teachings are not limited to the disclosed embodiments, but, on the contrary, the disclosure is intended to cover various modifications and equivalent arrangements included within the spirit and scope of the present teachings.

What is claimed is:
1. A backlight assembly comprising:
a plurality of light emitting diodes (LEDs) each configured to emit respective output light along a respective light output pathway;
a flexible printed circuit board (FPCB) on which the LEDs are mounted;
a light guide disposed to have a light incident surface corresponding to light outputting surfaces of the LEDs;
a main support configured to accommodate the LEDs and the light guide therein; and
a patterned adhesive member disposed on the FPCB and configured to affix the FPCB to each of the main support and the light guide,
wherein one adhesive surface of the adhesive member is attached to the FPCB and another adhesive surface of the adhesive member is attached to at least one of the main support and the light guide, and
wherein the adhesive member comprises a plurality of pieces on a bottom surface of the FPCB, each piece disposed between adjacent LEDs and extending in a longitudinal direction from the main support to the light guide, and a part connected to the plurality of pieces and also covering a side surface and a top surface of the FPCB.

2. The backlight assembly of claim 1, wherein the adhesive member is patterned to define air-filled grooves along the respective light output pathways of the LEDs and the defined air-filled grooves act to reduce coupling of leakage light from the light outputting surfaces of the LEDs and through the air-filled grooves.

3. The backlight assembly of claim 1, wherein each piece of the adhesive member between the LEDs is formed to have at least one of a quadrangular, trapezoidal, triangular, and circular shape.

4. The backlight assembly of claim 1, wherein one portion of the adhesive member is brought into contact with an upper surface of a side of the main support, and another portion thereof is brought into contact with an upper surface of a side portion of the light guide.

5. The backlight assembly of claim 4, wherein the adhesive member is partially formed as strips extending in a vertically longitudinal direction on a bottom surface of the FPCB.

6. The backlight assembly of claim 1, wherein the adhesive member includes at least one of a double-sided tape and a cured fluid adhesive.

7. A liquid crystal display comprising:
a liquid crystal panel;
a plurality of light emitting diodes (LEDs) configured to emit light;
a flexible printed circuit board (FPCB) on which the LEDs are mounted;
a light guide disposed to have a surface corresponding to light emitting surfaces of the LEDs;
a main support configured to accommodate the LEDs and the light guide therein; and
an adhesive member formed to affix together the FPCB, the main support, the light guide, and the liquid crystal panel,
wherein one adhesive surface of the adhesive member is formed on a bottom surface of the FPCB and is attached to the bottom surface of the FPCB, another adhesive surface of the adhesive member is attached to the main support and the light guide, and
wherein the adhesive member comprises a plurality of patterned parts such that its material is not continuously present along the respective light output pathways of the LEDs but is present at least partially between the LEDs, and a part connected to the plurality of patterned parts and also covering a side surface and a top surface of the FPCB.

8. The liquid crystal display of claim 7, wherein the adhesive member is formed as a single unit on a top surface and a bottom surface of the FPCB.

9. The liquid crystal display of claim 8, wherein each of the patterned parts has at least one of a triangular, quadrangular, and circular shape.

10. The liquid crystal display of claim 8, wherein one surface of the adhesive member formed on the top surface of the FPCB is attached to the top surface of the FPCB, and the other surface thereof is attached to the liquid crystal panel.

11. The liquid crystal display of claim 8, wherein the adhesive member is formed on the top surface of the FPCB, and the liquid crystal display further comprises a light blocking tape provided between the liquid crystal panel and the main support.

12. The liquid crystal display of claim 8, wherein the adhesive member includes strips each of a tape shape.

13. A liquid crystal display comprising:
a liquid crystal panel;
a plurality of light emitting diodes (LEDs) configured to emit light;
a flexible printed circuit board (FPCB) in which the LEDs are mounted;
a light guide disposed to have a surface corresponding to light emitting surfaces of the LEDs;
a main support configured to accommodate the LEDs and the light guide therein;
a light blocking tape configured to affix a top surface of the FPCB and the liquid crystal panel; and
an adhesive member formed to affix together a bottom surface of the FPCB, the main support, and the light guide,
wherein one surface of the adhesive member is attached to the FPCB, the other surface thereof is attached to the main support and the light guide, and
wherein the adhesive member comprises a plurality of pieces, each piece disposed between adjacent LEDs and extending in a longitudinal direction from the main support to the light guide, and a part connected to the plurality of pieces and also covering a side surface and a top surface of the FPCB.

14. The liquid crystal display of claim 13, wherein each piece of the adhesive member is formed to have a quadrangular, trapezoidal, triangular, or circular shape.

15. The liquid crystal display of claim 14, wherein one portion of the adhesive member is brought into contact with an upper surface of a side of the main support, and another portion thereof is brought into contact with an upper surface of a side of the light guide.

* * * * *